United States Patent [19]

Asimopoulos

[11] Patent Number: 5,652,654

[45] Date of Patent: Jul. 29, 1997

[54] DUAL BEAM SPECTROPHOTOMETER

[76] Inventor: George Asimopoulos, 201 Cherokee Dr., Blacksburg, Va. 24060

[21] Appl. No.: 689,391

[22] Filed: Aug. 12, 1996

[51] Int. Cl.⁶ .............................. G01J 3/08; G01J 3/18; G01J 3/42
[52] U.S. Cl. .............................. 356/325; 356/334
[58] Field of Search .................... 356/319, 320, 356/323, 324, 325, 326, 328, 334, 434

[56] References Cited

U.S. PATENT DOCUMENTS

| | | | |
|---|---|---|---|
| 2,404,147 | 7/1946 | Strickland, Jr. | 219/502 |
| 2,680,989 | 6/1954 | Savitzky et al. | 356/325 |
| 3,071,037 | 1/1963 | Brumley | 356/325 |
| 3,465,143 | 9/1969 | Doonan | 356/325 |
| 3,917,406 | 11/1975 | Siegler, Jr. | 356/319 |
| 4,099,872 | 7/1978 | White | 356/318 |
| 4,285,596 | 8/1981 | Landa | 356/308 |
| 4,478,513 | 10/1984 | Skinner et al. | 356/323 |
| 4,540,282 | 9/1985 | Landa et al. | 356/328 |
| 4,696,570 | 9/1987 | Joliot et al. | 356/319 |
| 4,756,619 | 7/1988 | Gerlinger et al. | 356/319 |
| 4,883,963 | 11/1989 | Kemeny et al. | 250/339.11 |
| 4,969,739 | 11/1990 | McGee | 356/308 |
| 5,020,909 | 6/1991 | Landa | 356/300 |
| 5,184,193 | 2/1993 | LeFebre | 356/325 |
| 5,251,006 | 10/1993 | Honigs et al. | 356/319 |

FOREIGN PATENT DOCUMENTS 56-166434  12/1981  Japan ............................ 356/323

OTHER PUBLICATIONS

Skinner et al, "A double-beam telespectrophotometer for field use", J. Phys. E:Sci. Instrum., vol. 15, No. 3, 1982 Printed in Great Britian. Copy in 356–323.

*Primary Examiner*—F. L. Evans
*Attorney, Agent, or Firm*—Lawrence R. Franklin

[57] ABSTRACT

A dual beam spectophotometer is described in which a beamsplitter is at least partially surrounded by a chopper, the combination of which provide sample and reference beams. An oscillating grating produces a monochromatic light beam scans a selected spectral range of wavelengths. The movement of a second chopper and of the oscillating grating is controlled to alternately pass sample and reference spectrums for detection by a detector and to block all radiation. Detected signals are processed for storage by suitable electronics and a computer. The electronics also control the motion of the oscillating grating and chopper. A set of beamsplitters with distinctly different sample-to-reference beam ratios are provided to add versatility to the spectrophotometer.

23 Claims, 4 Drawing Sheets

DUAL BEAM SPECTROPHOTOMETER

FIELD OF THE INVENTION

This invention relates to a dual beam spectrophotometer for analyzing the light emanating from a sample material, e.g., by reflectance, transmission, or any other suitable reactance, in response to said sample being illuminated by a monochromatic light beam of known wavelengths. A single, monochromatic source beam is split into dual beams, a sample beam for illumination of the sample and a reference beam for comparison with the resulting data. While the near infrared wavelengths are of particular interest, the invention is applicable to other wavelengths, such as the visible spectrum.

DESCRIPTION OF RELATED ART

Spectrophotometers generally are either single beamed or dual beamed. Examples of single beam spectrophotometers include Landa, U.S. Pat. No. 4,285,596, Landa et al, U.S. Pat. No. 4,540,282, Kemeny et al, U.S. Pat. No. 4,883,963, McGee, U.S. Pat. No. 4,969,739, Landa, U.S. Pat. No. 5,020,909, and Honigs et al, U.S. Pat. No. 5,251,006. Single beam spectrophotometers suffer from the disadvantage of being unable to compensate for real-time fluctuations in system parameters which could adversely affect the resulting data. Dual beam spectrophotometers provide a reference signal which, when compared with the sample signal, minimizes the effects of real-time fluctuations. See White, U.S. Pat. No. 4,099,872, Landa et al, U.S. Pat. No. 4,540,282, Joliot et al, U.S. Pat. No. 4,696,570, Gerlinger et al, U.S. Pat. No. 4,756,619, and Le Febre, U.S. Pat. No. 5,184,193, for representative examples of dual beam spectrophotometers. The instant invention avoids the problems inherent in single beam spectrophotometers by utilizing the dual beam approach.

Prior art dual beam spectrophotometers also have disadvantages which are overcome by the instant invention.

White, U.S. Pat. No. 4,099,872, discloses a spectrophotometer (FIG. 1) comprising a light source, a monochomator, a beamsplitter which provides a reference beam directed to a detector and a sample beam directed to a sample whose emanations are directed to the detector. A chopper alternately blocks each beam allowing the detector to alternately receive the reference beams and the beams emanating from the sample. A reference material, a hollow prism filled with rhodamine B solution, is inserted into the reference beam.

While White is adequate for its intended functions, certain problems or inconveniences are inherent therein.

The chopper used by White is a constantly rotating, planar disc having an arcuate cutout which alternately and mutually exclusively passes the sample beam and the reference beam.

Since White's chopper is planar, the perimeter thereof is spaced a considerable distance from the beamsplitter, even though the axis of the chopper is relatively close to the edge of the beamsplitter. The diameter of the chopper must be large, since it must intersect the paths of the sample and reference beams, disclosed as diverging at a ninety degree angle, which increases the size of the chopper itself, and consequently requires a large volume to be occupied by the chopper/beamsplitter combination.

The two choppers disclosed herein are not planar, being designed to at least partially enclose the beamsplitter, thereby reducing the size of the chopper, the size of the volume occupied by the chopper/beamsplitter combination, and ultimately the size of the spectrophotometer. The disclosed ninety degree chopper has vanes which partially enclose the beamsplitter, allowing it to be smaller and to be positioned much closer to the beamsplitter than planar choppers like White's. The disclosed octagonal chopper completely surrounds the beamsplitter, permitting the chopper/beamsplitter combination to occupy a volume only slightly larger than that of the beamsplitter itself.

As stated, White's reference and sample beams diverge at a ninety degree angle, forcing White's chopper to intersect them at an acute angle. The reference and sample beams of this disclosed invention also diverge at a ninety degree angle. Since the beamsplitter bisects the ninety degree angle of the ninety degree chopper, its planar vanes are perpendicular to the sample and reference beams. In like manner, the segments of the octagonal chopper also are orthogonal to the two beams. This novel relationship is important in the reference material mode of operation of the disclosed spectrophotometer, as will be brought out in more detail later.

Figures 5A, 5B, 5C, 5D:
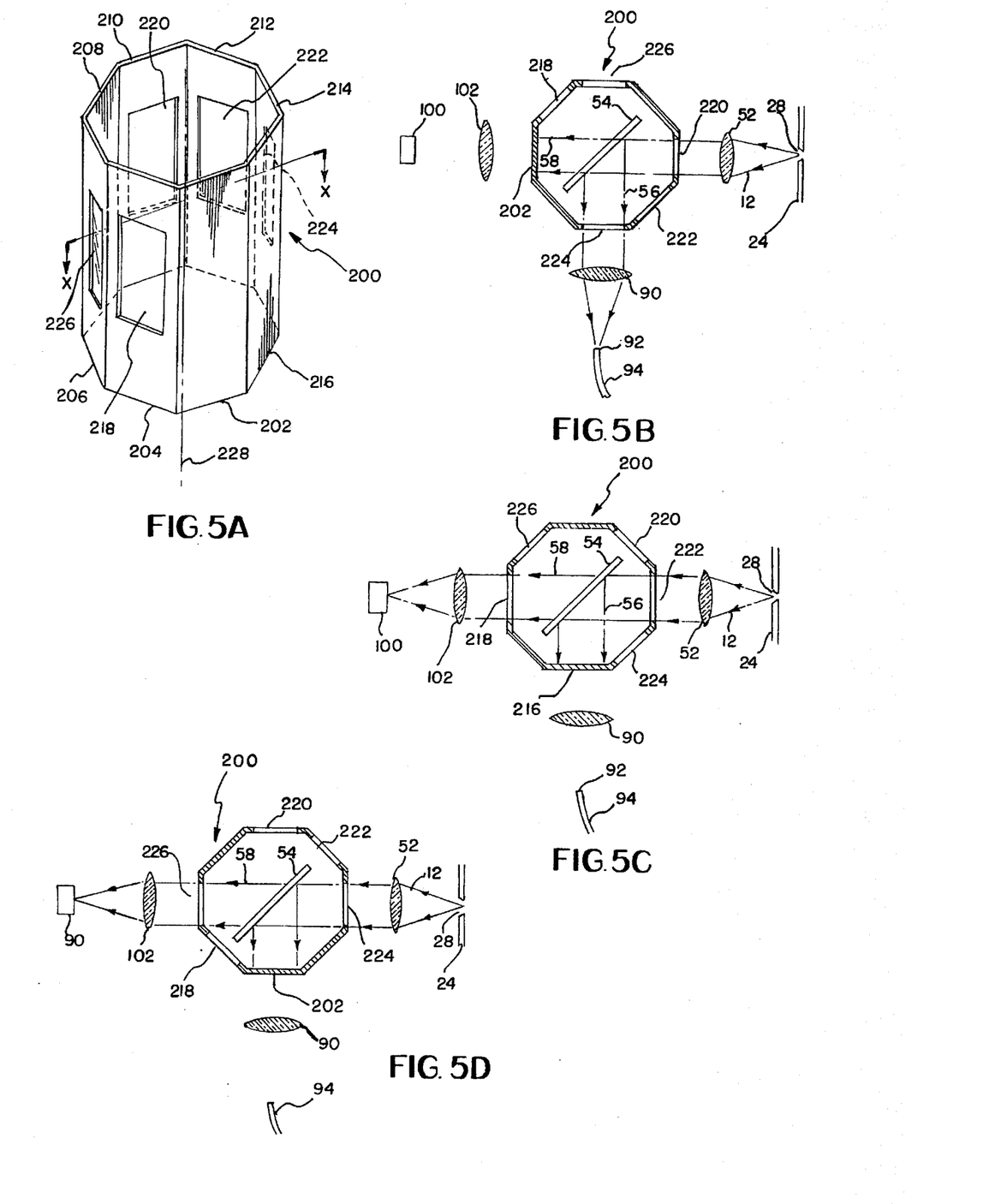
FIG. 5A shows a perspective view of an octagonal, cylindrically-shaped chopper utilized in a second embodiment of the spectrophotometer.
FIG. 5B shows a top view of the octagonal chopper surrounding the beamsplitter in a first rotary position.
FIG. 5C shows the octagonal chopper in a second rotary position.
FIG. 5D shows the octagonal chopper in a third rotary position.

White's chopper is continuously rotated, requiring an unalterable, continuously repeating cycle of reference-sample-reference-sample measurements. The choppers herein are selectively stepped to the orientation desired at the moment. They may be continuously oscillated between sample and reference measuring orientations, such as shown in FIGS. 5B and 5C, thereby achieving the same operating conditions as White, or they can be stopped at any desired orientation to concentrate on gathering data in any of the sample, reference, or reference material modes.

Finally, in order to compare the sample spectra to the spectrum of a known reference material, White physically places a reference material, the aforementioned prism filled with a rhodamine B solution, in the path of the reference beam, requiring added volume in the spectrophotometer for the prism and its mount and added labor to insert and remove the prism. The inventive choppers include a reference material in one of their segments which may be stepped into the reference beam with no increase in labor, simply by including the test in the computer programming—and at no increase in the size of the spectrophotometer.

Other patents show the use of a reference material to obtain a known spectrum for comparison with the sample spectrum. Landra, U.S. Pat. No. 5,020,909, includes the reference material, polystyrene, as segments alternating with open segments in a rotating wheel located in the single beam. Thus, Landra's sample is alternately illuminated by the spectra of a monochromatic "sample" beam and the spectra of the monochromatic beam after it has passed through the reference material, a process which superposes the reference spectrum on the sample. The two spectrums emanating from Landra's sample corresponding to the sample and reference beams require a "mathematical deconvolution" of the spectra by the system's electronics and/or software to "time resolve" the sample and reference spectra. The invention disclosed herein illuminates the sample only with the sample beam, eliminating the need for the complex post-detector hardware and software. Landra, U.S. Pat. No. 4,285,596, and Le Febre, U.S. Pat. No. 5,184,193, both discuss the known method of replacing the sample material with a reference material, e.g. Teflon. Joliot et al, U.S. Pat. No. 4,696,570, use two separate bundles of optical fibers to channel half the monochromatic light to sample and reference materials, each of which has its own responsive detectors and electronics. Honigs et al, U.S. Pat. No. 5,251,006, adds a paddle positioned by a stepping motor in the path of the dispersed beam from a monochromator. Polystyrene and didymium plates are mounted on the paddle for use with infrared and visible light, respectively. When testing for reflectance, the sample must be replaced with a Coors ceramic plate, and for taking transmission measurements, the sample must be removed, both of which are labor intensive. They are necessary, however, since the spectrophotometer of Honigs et al is single beamed. Obviously, these prior art spectrophotometers include more complicated means of obtaining a reference spectrum than contemplated in this invention.

Landa et al, U.S. Pat. No. 4,540,282, disclose an embodiment in FIGS. 7A–C that provides what they refer to as a dual beam operation. A portion of the light incident on the sample is intercepted by fiber optics and diverted to detector electronics for comparison with the output of the sample. While this has the advantage of generating a reference beam simultaneously with the sample beam, it also has the disadvantage of placing a foreign object in the path of the sample beam, required because there is no separate reference beam, which diminishes the sample beam and which inevitably introduce other perturbations, e.g., shadows and variations in light intensities on portions of the sample. Also, inasmuch as both reference beams and sample beams are fed simultaneously to the double beam electronics, two detectors, each with their costly electronics, are needed.

Gerlinger et al, U.S. Pat. No. 4,756,619, disclose a spectrophotometer in which a sample reflectance beam is directed via fiber optics to a detector. A reference beam is received either directly from the light source or indirectly by being reflected from a window, whereupon it is directed by fiber optics to a second detector. The system requires two detectors which, being different, introduce unsupervised differences into the analyses of the sample.

Le Febre, U.S. Pat. No. 5,184,193, discloses a spectrophotometer in which sample and reference readings are effected by alternately shifting sample and reference input bundles of fiber optics into alignment with the output slit of a monochromator. The spectrophotometer requires additional structure which, being moved constantly, is cumbersome and potentially introduces mechanical problems into the system.

The disclosed invention avoids these problems by generating completely separate and independent reference and sample beams, each ultimately sensed by the same detector, and by eliminating added moving elements. The system disclosed and claimed herein is conceptually different than those shown in these patents.

In spectrophotometers where the dispersal grating is oscillated, it is known to provide a "dark" signal, a portion of the measuring cycle in which no sample or reference beam is allowed to reach the detector, to correct for system drift. Landa ('596), Landa et al, and McGee are representative. Landa (596) inserts a rotating filter wheel in the single beam exiting from the grating. The rotation of the wheel is synchronized with the oscillations of the grating such that one of a pair of opaque segments on the wheel intercepts the beam at the limits of travel of the grating, i.e., when the grating changes direction. Landa et al mount an opaque optical shutter on the grating to block incident light to the grating also at the limits of travel of the grating. McGee blocks the light from the grating with an opaque segment of a filter paddle placed adjacent the exit slit of the monochromator, again at the limits of the grating oscillations. In all of these, the portions of the spectra dispersed near the edges of the grating are blocked by the opaque elements, resulting in a loss of band width. These systems require a swing of the grating beyond the "useful" portion of the dispersed spectra, i.e., the spectral band actually used in making measurements, in order to obtain the dark portion set aside for compensating for drift. A major feature of the instant invention is a chopper adjacent the exit slit of the monochromator which blocks light dispersed during one-half, the clockwise half, of the oscillations of the grating to provide the dark signal. As such, the angular swing of the grating can be shortened to just the aforementioned "useful" portion, reducing the amount of time needed per complete oscillation of the grating. The testing period is subsequently shortened compared to those described above for the same number of oscillations.

SUMMARY AND OBJECTS OF THE INVENTION

The present invention overcomes the difficulties described above by providing a dual beam spectrophotometer system comprising an oscillating grating for providing a continuous scanning of the spectral wavelengths of interest, a chopper for blocking the dispersed spectra during one half of the grating's oscillations, a beamsplitter selected from a set of beamsplitters having distinctly different splitter intensity ratios for providing dual beams for detection, a unique radiation chopper for permitting analyses using sample beams, reference beams, and comparisons with a known reference material, and a unique beamsplitter/radiation chopper arrangement for reducing the size of the spectrophotometer. System electronic components which include a computer are used to measure and compare both beams and to synchronize the movements of the choppers and grating.

An object of the invention is to provide a compact, dual beam spectrophotometer with relatively few moving parts.

Another object of the invention is to provide two embodiments of chopper structure for alternately and mutually exclusively passing and blocking reference and sample radiation beams. The first chopper embodiment includes a pair of fan-shaped vanes defining a ninety degree angle therebetween which partially encloses the beamsplitter; the second chopper embodiment includes a rotating cylinder, preferably octagonally shaped in cross-section, surrounding the beamsplitter.

Another object of the invention is to provide a radiation chopper which includes a reference material for insertion into the reference beam.

Another object of the invention is to provide an additional chopper to block the dispersed beam from the oscillating grating, not only to provide a dark signal for calibration purposes, but also to limit the monochromator output beam to one half of the grating oscillation cycle.

Another object of the invention is to provide a set of variable ratio beamsplitters to permit better matching of the sample and reference beam's intensities with the selected sample.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DESCRIPTION OF THE PREFERRED EMBODIMENTS

Figure 1:
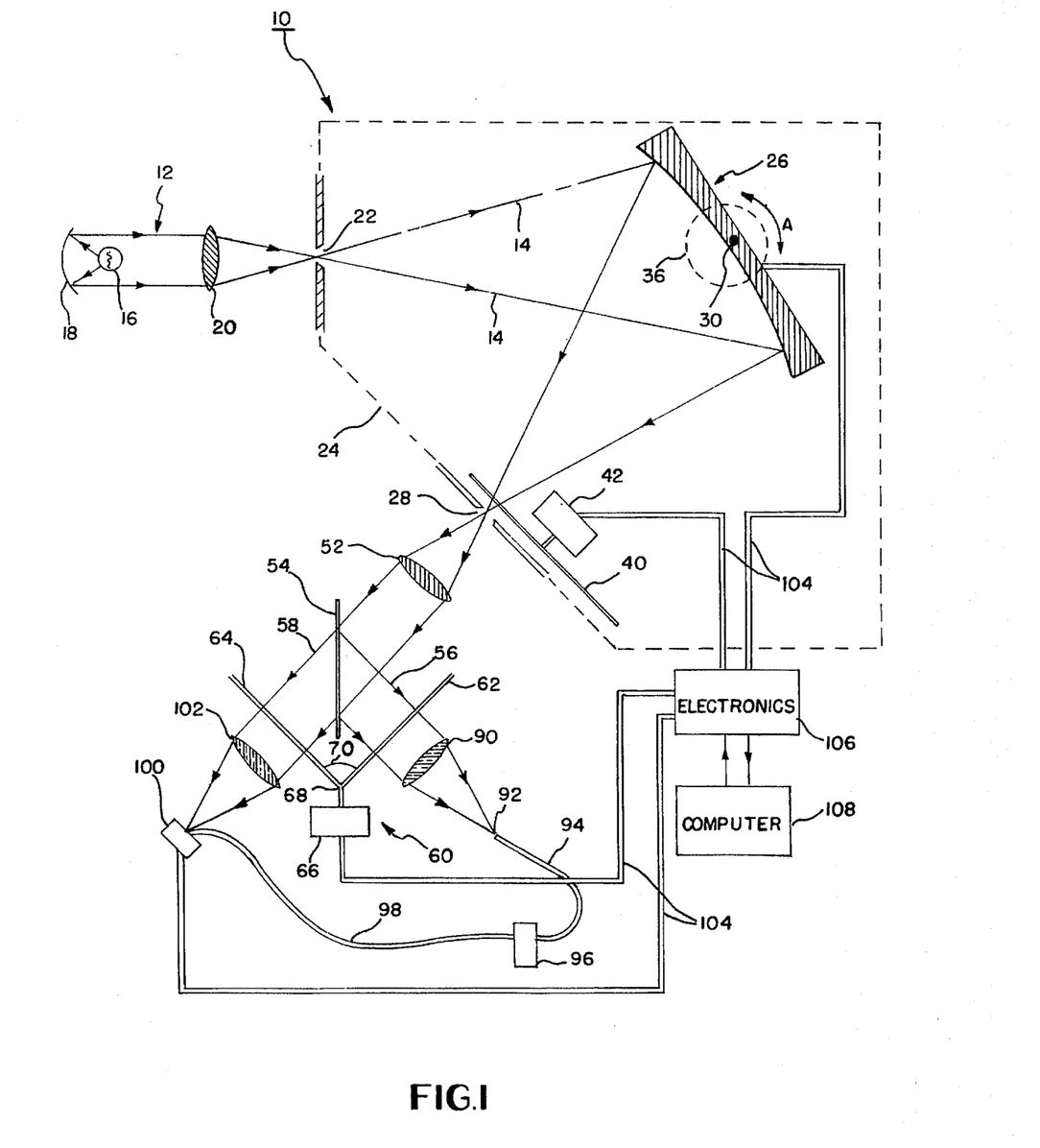
FIG. 1 illustrates a schematic representation of the components of the dual beam spectrophotometer.

FIG. 1 shows a schematic representation, not in exact proportions, of a dual beam spectrophotometer 10. A polychromatic radiation beam 12, depicted by its envelope rays 14, is produced by an appropriate light source 16, such as a halogen lamp. (As used herein and in the claims, terms such as "light," "radiation," and "polychromatic," or their equivalents, are independent of wavelengths and are intended to denote not only visible light but wavelengths above and below the visible.) Radiation beam 12 is focussed by a parabolic reflector 18 and a lens 20 onto an entrance slit 22 of a grating monochromator 24. Entrance slit 22 is elongated in a direction perpendicular to the plane of the drawing. An oscillating, concave, holographic grating 26 disperses radiation beam 12 and focusses the selected spectrum at exit slit 28 of monochromator 24. Exit slit 28 is elongated in the same direction as entrance slit 22.

Figure 2A:
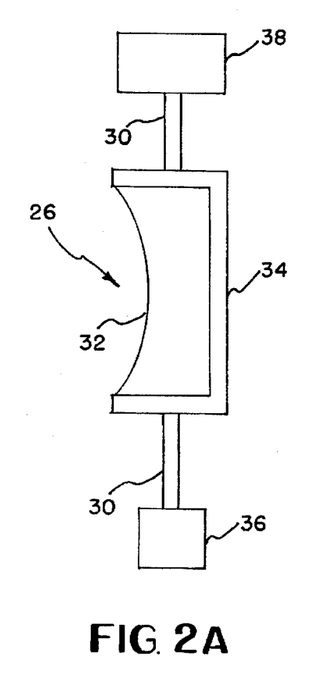
FIG. 2A shows a side view of the oscillating grating.
Figure 2B:
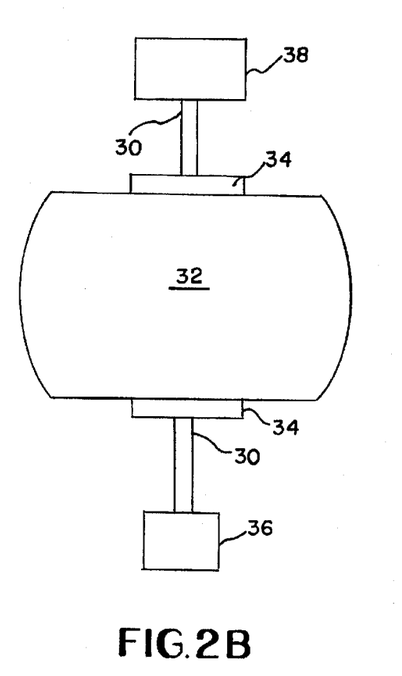
FIG. 2B shows a front view of the oscillating grating.
Figure 2C:
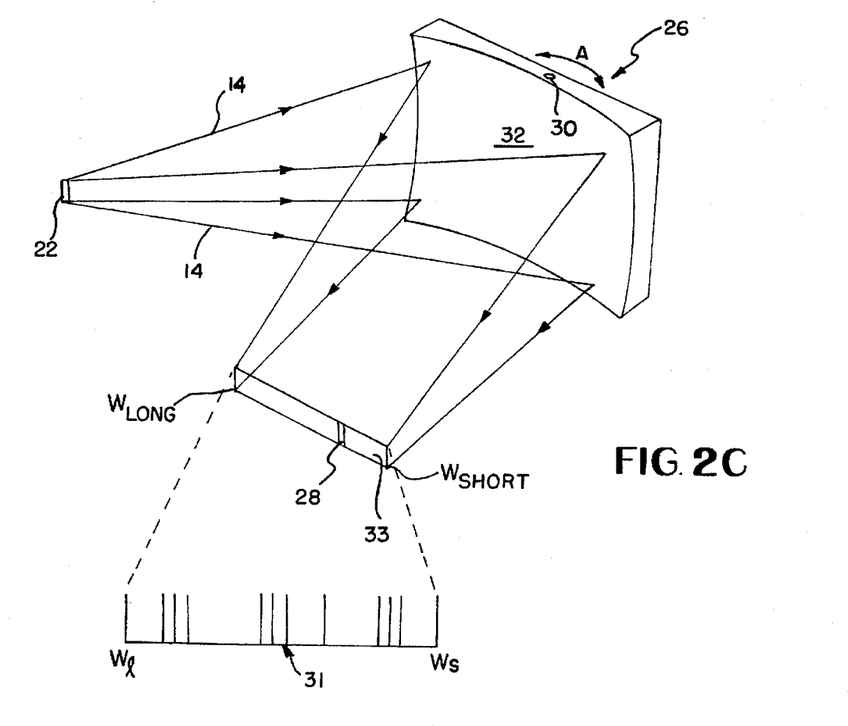
FIG. 2C is a perspective view of the oscillating grating.

Grating 26, shown in a cross-sectional top view in FIG. 1, oscillates back and forth as shown by double-ended arrow A about an axis 30. Referring to FIGS. 2A-2C, oscillating grating 26 comprises a grating surface 32 mounted on a bracket 34 and is concave both vertically (FIG. 1) and horizontally (FIG. 2A). In the preferred embodiment, surface 32 is a segment of a spherical surface with a radius approximately equal to the distance from entrance slit 22 to the center of surface 32. This allows grating 26 to focus the spectral lines dispersed by surface 32 onto exit slit 28 without the necessity of lenses or mirrors. Bracket 34 is rotated on axis 30 (in the plane of the drawings in FIGS. 2A and 2B) for oscillating movement by motor 36 (shown in phantom in FIG. 1). Encoder 38 provides a signal which precisely monitors the angular position of grating 26 to identify the wavelength of dispersed radiation beam 12 which is currently passing through exit slit 28. Motor 36 and encoder 38 are controlled by computer-governed electronics, to be described later.

FIG. 2C illustrates the operation of grating 26. Surface 32 disperses the polychromatic, white light generated by lamp 16 into a spectral band 31, depicted as bordered by rectangle 33 in FIG. 2C, with the shorter wavelengths being separated to the right of rectangle 33 and the longer wavelengths being separated to the left of rectangle 33. Band 31 is schematically illustrated below rectangle 33 in FIG. 2C as a series of spectral lines, which appear as reflected images of entrance slit 22. When grating 26 is rotated clockwise to its maximum, the shortest wavelength line is focussed on exit slit 28. At its counter-clockwise limit, the longest wavelength line is focussed on exit slit 28. As grating 26 is oscillated counter-clockwise, each spectral line passes in turn over exit slit 28 and, thereby, passes through it. Thus, oscillating grating 26 scans the entire range dispersed by the particular grating chosen, and the radiation emerging from exit slit 28 is monochromatic. Band 31 is scanned from the shortest wavelength to the longest wavelength during the counter-clockwise rotation of grating 26 and from the longest wavelength to the shortest wavelength during the clockwise rotation of grating 26. If grating 26 were stationary, only one wavelength would be available for measurement; to change the selected wavelength would require changing of the grating itself or of the grating's angular position, both of which are costly. By oscillating grating 26, each wavelength in the spectral range selected is instantaneously available.

Figures 3, 4A, 4B, 4C:
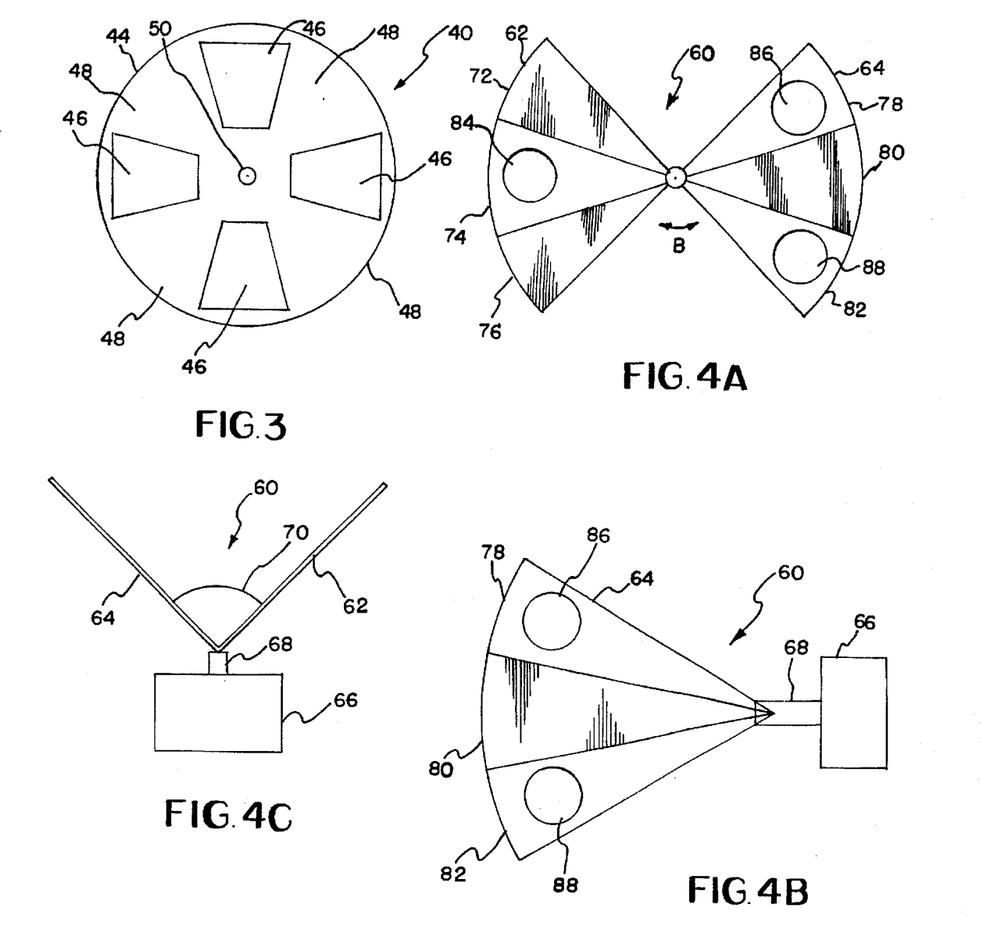
FIG. 3 is a front view of a chopper located adjacent the exit slit of the monochromator.
FIG. 4A shows a front view of the ninety degree chopper utilized in a first embodiment of the spectophotometer.
FIG. 4B shows a side view of the ninety degree chopper.
FIG. 4C shows a top view of the ninety degree chopper.

Returning to FIG. 1, a flat, circular, rotating chopper 40, driven by motor 42, is located prior to and adjacent to exit slit 28 and is synchronized with the motion of grating 26. While this location is preferred, clearly any location between light source 16 and beamsplitter 54 would function as well. As illustrated in FIG. 3, chopper 40 is a circular disc 44, rotatable about axis 50, having four open segments 46 separated by four closed, i.e., opaque, segments 48. Chopper 40 is synchronized with the motion of the grating 26 in such a way as to allow radiation beam 12, which is now monochromatic, to pass through exit slit 28 during counter-clockwise movement of grating 26 and to block radiation during clockwise movement, thereby scanning band 31 repeatedly from shortest to longest wavelengths, while blocking all scans from longest to shortest wavelengths. Of course, chopper 40 is not limited to four open and four closed segments; so long as the output radiation from grating 26 is blocked during the clockwise rotations, whether effected by two, six, ten, or any number of openings, the function desired has been achieved.

It is known that detectors record two distinct spectral bands from a rotating grating corresponding respectively to the two directions of rotation, clockwise and counter-clockwise, of the grating, even though the same spectral band is being dispersed by the grating. The reason for this is that there is a time delay between the time that light illuminates a detector and the time that the detector generates a signal in response to that illumination. That delay is referred to as the time constant of the detector. Typical detectors used in the near infrared range have time constants of around one hundred microseconds, i.e., there is a one hundred microsecond delay between the time the light illuminates the detector and the time that the detector generates a signal in response thereto. When a spectrum from an oscillating grating is recorded, the peaks of the spectrum are shifted a few wavelengths in the direction of scan; the amount of shift is dependent on scan speed, i.e., how fast the grating is oscillating, and the time constant of the detector. In addition, the shape of the peaks are distorted, such that what should be a perfectly symmetrical peak will appear sharper on the up-side and longer on the down-side. It is readily apparent, therefore, that the appearance of band 31 will be different when scanned in one direction compared to that when scanned in the opposite direction. That is, there would not be a perfect match of spectral lines if the two scans were superposed on one another; these are the two distinct spectral bands referred to. In practice, even with instruments that are designed to measure the spectra in both directions, only readings gathered in one direction are actually used. The other spectrum is ignored either by the electronics of the instrument or by the software in the computer. In the instant invention, limiting the scans to one direction of wavelength progression, i.e, one of the two spectral bands, is effected by blocking one half of the output spectra of grating 26 by chopper 40. This not only insures the spectral integrity of band 31 but eliminates the need for the more complex electronics or software currently in use for eliminating the other spectral band. Also, as stated above, blocking the output of one direction of the oscillation cycle permits the entire grating swing to be utilized, allowing smaller grating oscillations to be used without diminishing the band width of the output spectra, thus making the scan faster.

Typically, the spectra of thirty to fifty scans are averaged per sample to enhance the quality of results and to minimize noise.

When radiation beam 12 is permitted to exit monochromator 24 through exit slit 28 by chopper 40, spectrophotometer 10 provides a test beam used to analyze a sample and the instrumentation will provide positive data. When radiation beam 12 is blocked by chopper 40, the instrumentation will measure a "dark signal" which is used to correct for instrument noise and detector drift.

After passage through exit slit 28, as illustrated in FIG. 1, radiation beam 12 is collected and collimated by lens 52 and directed onto beamsplitter 54, e.g., a partially-silvered mirror. Other known beamsplitters may also be used, such as, linear or annular bands of reflective material separated by transparent bands. Beamsplitter 54 produces two beams: sample beam 56 that is reflected off beamsplitter 54 and a reference beam 58 that passes through beamsplitter 54, or vice versa. According to an important aspect of the invention, beamsplitter 54 can be selected from a set of beamsplitters having distinctly different ratios of reference and sample beam intensities, preferably between 5% reference beam, 95% sample beam and 5% sample beam, 95% reference beam, for example, 50% reference and 50% sample or 25% reference and 75% sample, so that the system can be customized to give optimum results for different types of samples. Some samples require more or less sample beam intensities than others, e.g., dark samples may require higher sample beam intensity to produce a better spectrum, whereas clear samples may require lower sample beam intensity. The capability of changing the beam intensity ratio by simply changing beamsplitter 54, along with the electronic adjustment of the detector gain which is available in the system, gives great flexibility to spectrophotometer 10 as to the type of samples that the instrument can analyze.

After radiation beam 12 is divided by beamsplitter 54 into sample beam 56 and reference beam 58, they are directed to a chopper 60, where they are alternately and mutually exclusively passed or blocked. That is, chopper 60 passes either a sample beam or a reference beam, but never both at the same time, as will be explained below.

Chopper 60 comprises two fan-shaped vanes, a sample vane 62 upon which sample beam 56 is incident and a reference vane 64 upon which reference beam 58 is incident. Chopper 60 is oscillated by stepping motor 66 via motor output shaft 68 as indicated by double-ended arrow B (FIG. 4A). Since sample vane 62 and reference vane 64 define a ninety degree angle 70 therebetween, chopper 60 is referred to herein as a ninety degree chopper.

Turn now to FIGS. 4A–4D.

In the front view of FIG. 4A, sample vane 62 and reference vane 64 of ninety degree chopper 60 are seen to be fan-shaped, each comprising three pie-shaped segments, sample vane 62 including segments 72, 74, and 76, and reference vane 64 including segments 78, 80, and 82. Sample vane 62 is shown as having an opening 84 in segment 74 with segments 72 and 76 being opaque. Sample beam 56 can pass though sample vane opening 84, but it is blocked by opaque segments 72 and 76. Reference vane 64 includes an opening 86 in segment 78, an opaque segment 80, and a reference material 88, e.g., a polystyrene disk, in segment 82. Reference beam 58 can pass though reference vane opening 86 or polystyrene disk 88 but is blocked by opaque segment 80. The positions of the openings and disk are illustrative only. They can be located in any segment as desired, requiring only a change in the program in the computer to insure proper processing of the received signals. The purpose of the polystyrene disk will be discussed shortly.

The size and shape of the openings and disk are shown as circular, but this is merely for illustration. Clearly, so long as the monochromatic sample and reference beams are passed by the openings or disk and blocked by the opaque segments, the purposes of the invention will be fulfilled.

Figure 4D:
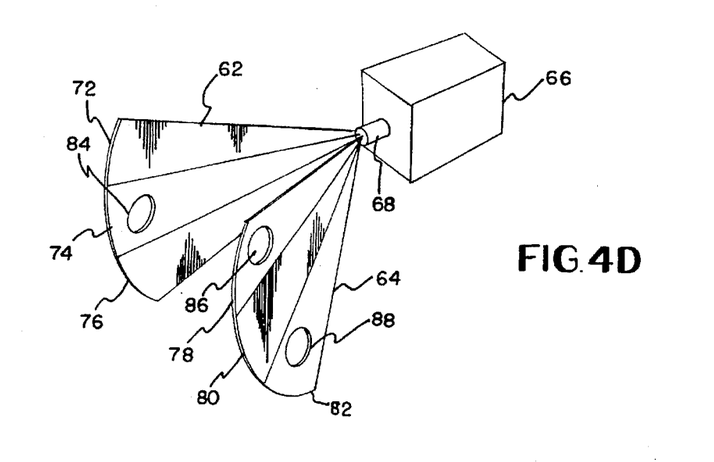
FIG. 4D shows a perspective view of the ninety degree chopper.

A side view of ninety degree chopper with motor 66 is shown in FIG. 4B, a top view of ninety degree chopper 60 is shown in FIG. 4C, and a perspective view is shown in FIG. 4D. The reference numerals correspond to those previously assigned.

As seen in FIG. 1, chopper 60 partially encloses beamsplitter 58 which is oriented to substantially bisect angle 70. By partially enclosing beamsplitter 54, the size of the beamsplitter/chopper combination is reduced, when compared to previous combinations, such as shown by White, discussed above, ultimately reducing the size of the spectrophotometer. Because radiation beam 12 is incident on beamsplitter 54 at a forty-five degree angle and because beamsplitter 54 bisects the ninety degree angle of chopper 60, sample beam 56 and reference beam 58 are incident substantially orthogonally on sample vane 62 and reference vane 64. When reference material 88 is inserted in the path of reference beam 58, light incident at an angle other than ninety degrees has a portion reflected from its surface as well as producing unwanted internal reflections. Orienting reference material 88 orthogonally to reference beam 58 minimizes the reflections, thereby providing a higher quality signal to the detector.

The operation of chopper 60 will now be described.

Assume that sample beam 56 and reference beam 58 are aligned horizontally on a line which includes the axis of chopper 60. As seen in FIG. 4A, then, when sample beam 56 is passed through opening 84, reference beam 58 will be blocked by opaque segment 80. When chopper 60 is rotated clockwise such that sample beam 56 is blocked by opaque segment 76, reference beam 58 will pass through opening 86. And, when chopper 60 is rotated counter-clockwise such that sample beam 56 is blocked by opaque segment 72, reference beam 58 will pass through polystyrene disk 88. Thus, only one beam will pass through chopper 60 at any one given time.

Returning to FIG. 1, after leaving beamsplitter 54, sample beam 56 is directed to sample vane 62 of ninety degree chopper 60, where it passes through opening 84 to lens 90 which focusses it onto the entrance end 92 of fiber optic cable 94 and therethrough to the sample 96 to be analyzed. In response to being illuminated by sample beam 56, light emanates from sample 96. The terms "emanate", "emanations", or equivalent derivatives, are herein used to denote the light leaving sample 96 by whatever process is operative. These emanations may be due to reflectance, transmittance, exitation, flourescence, or the result of any reactance of sample 96 with sample beam 56 and includes but is not limited to light which originates from the sample by a process of generation. The spectra leaving sample 96 are gathered by fiber optic cable 98 for deliverance to detector 100. The fiber optics can be either a single fiber, fiber bundles, or any other appropriate light guiding media, or any combination of the above.

Alternatively, when sample beam 56 is blocked by opaque segment 76 of vane 62 of chopper 60, reference beam 58 passes through opening 86 to lens 102 which focusses it onto detector 100. Detector 100 is electrically connected by cables 104 to suitable processing electronics 106, monitored and controlled by computer 108, which processes the incoming data as well as controlling and synchronizing grating motor 36 and chopper motors 42 and 66.

The operation of the disclosed spectrophotometer should be apparent to one skilled in the art from the description thereof above. Nonetheless, a brief description of spectrophotometer 10 follows.

A broad spectrumed radiation beam 12 is generated by light source 16 and is focussed on oscillating grating 26 which selects a continuously changing set of light frequencies for analysis. Computer 108 continuously monitors the angular position of grating 26 and thereby the spectral lines instantaneously being selected. The selected monochromatic beam is passed through sample opening 84 to sample 96, and the spectra emanating therefrom are detected by detector 100. Then, sample beam 56 is blocked, and reference beam 58 is passed to detector 100 for comparison with the detected sample's emanations. The computer controlled electronics analyzes and stores the gathered data. This continues over the entire range of frequencies selected by oscillating grating 26. As stated previously, the spectra of thirty to fifty scans are typically averaged per sample.

Should one desire to compare the sample's emanations to a known spectrum, such as polystyrene, to thus offer the possibility of verifying the operation of the instrument and provide the basis for calibrating the same, reference beam 58 can be passed through polystyrene disk 88 to detector 100 for comparison. Of course, polystyrene has been included in this specification merely as an example; any other material or filter having a known spectrum in the range of interest could be substituted for polystyrene. It is within the purview of the invention to add other vane segments adapted to hold other reference materials, the number of additional segments being limited only by the physical confines of the oscillating chopper.

It should be noted that the reference material is inserted only in the reference beam. The integrity of the sample beam, and thereby of the sampling process, is not violated by making a reference material comparison. Also, inasmuch as the reference material is a structural part of the post-beamsplitter chopper, no labor intensive steps are necessary to add it to the system.

Intermittently throughout the experiment, chopper 40 blocks radiation beam 12 from reaching beamsplitter 54, thereby inhibiting both sample beam 56 and reference beam 58 from reaching detector 100. With no radiation at all being incident upon detector 100, computer 104 has an opportunity to continuously monitor the detector and the electronics system for noise and/or drift and make allowances therefor.

Another chopper embodiment which may be used in spectrophotometer 10 is illustrated in FIGS. 5A through 5D.

As shown in FIG. 5A, this embodiment utilizes an octagonally shaped, cylindrical chopper 200 (hereafter, octagonal chopper 200) having eight segment faces 202, 204, 206, 208, 210, 212, 214, and 216. Segments 202, 208, and 216 are opaque. Segments 204, 210, 212, and 214 have openings 218, 220, 222, and 224, respectively. Segment 206 has a polystyrene window 226 therein. Octagonal chopper 200 is positioned to surround beamsplitter 54, as shown in FIGS. 5B–5D. As with ninety degree chopper 40, additional sides can be added to octagonal chopper 200 for additional reference materials, if desired. Octagonal chopper 200 is rotated, e.g., stepped, about its cylindrical axis 228 by any suitable means, with the remaining components, i.e., beamsplitter 54, lenses 52, 90, and 102, monochromator 24, detector 100, and fiber optics cables 94 and 98, remaining stationary. Limiting the mechanical movements of the system to grating 26, chopper 40, and chopper 60 (or 200) minimizes the potential for mechanically introduced errors or failures.

Referring to FIG. 5B, the sample analyzing phase of operation is disclosed. Radiation beam 12 exits monochromator 24 through exit slit 28 where it is collected and collimated by lens 52 and directed toward octagonal chopper 200 and beamsplitter 54. In the rotational orientation shown in FIG. 5B, radiation beam 12 passes through opening 220 onto beamsplitter 54, which divides it into sample beam 56 and reference beam 58. Reference beam 58 is blocked by opaque segment 202, thereby preventing it reaching detector 100 through lens 102. Sample beam 56 exits through opening 224 to lens 90 which focusses it onto the entrance end 92 of fiber optic cable 94 and therethrough, as before, to the sample 96 to be analyzed. The post-sample signal is subsequently directed to detector 100 by fiber optics 98.

The reference phase of operations is shown in FIG. 5C. Radiation beam 12 exits monochromator 24 through exit slit 28 where it is collected and collimated by lens 52 and directed toward octagonal chopper 200 and beamsplitter 54. In the rotational orientation shown in FIG. 5C, radiation beam 12 passes through opening 222, divides at beamsplitter 54 into sample beam 56, which is blocked by opaque segment 216, and into reference beam 58, which is passed through opening 218 to lens 102 and detector 100.

In normal use, chopper 200 is stepped to either the FIG. 5B orientation or to the FIG. 5C orientation, where it remains for a large number of oscillations of grating 26, i.e., a large number of scans. Chopper 200 is then stepped to the other orientation for a comparison run of a large number of scans. The time saved from rotating a chopper, which provides only two scans per rotation, is enormous in a busy laboratory. Of course, chopper 200 can be stepped repeatedly from the FIG. 5B orientation to the FIG. 5C orientation, back to the FIG. 5B orientation, back to the FIG. 5C orientation, and so on, which, since each step is a one-eighth rotation of chopper 200, as opposed to a complete revolution thereof as required by continuously rotating choppers, also saves valuable testing time, but this mode of operation would not take full advantage of the invention's inherent benefits. Maintaining the chopper in a static position over a plurality of grating scans is an option which is not available with continuously rotating choppers. This, of course, applies to ninety degree chopper 60 as well.

The system verification phase is shown in FIG. 5D. Radiation beam 12 exits monochromator 24 through exit slit 28 where it is collected and collimated by lens 52 and directed toward octagonal chopper 200 and beamsplitter 54. In the rotational orientation shown in FIG. 5D, radiation beam 12 passes through opening 224, divides at beamsplitter 54 into sample beam 56, which is blocked by opaque segment 202, and into reference beam 58, which is passed through polystyrene window 226 to lens 102 and detector 100. When a reference run is desired, chopper 200 is stepped one more counter-clockwise rotation from the FIG. 5C orientation to that shown in FIG. 5D. Again, the reference run may be maintained for as long as desired.

The operations of spectrophotometer 10 in this embodiment is the same as in the first embodiment.

It is clear from the above that the objects of the invention have been fulfilled.

Those skilled in the art will appreciate that the conception, upon which this disclosure is based, may readily be utilized as a basis for the designing of other structures, methods and systems for carrying out the several purposes of the present invention. For instance, the octagonally shaped cylindrical chopper may also be shaped as a true annular cylinder with the apertures being similarly angularly located. It is important, therefore, that the invention be regarded as including such alternative constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the invention. The Abstract is neither intended to define the invention, nor is it intended to be limiting as to the scope of the invention in any way, which is measured solely by the claims.

I claim:

1. A dual beam spectrophotometer, comprising:
   means for producing a monochromatic beam;
   beamsplitter means for dividing said monochromatic beam into a reference beam and a sample beam;
   chopper means for mutually exclusively blocking or passing said reference beam and said sample beam, said chopper means comprising a pair of vanes with a ninety degree angle therebetween to at least partially enclose said beamsplitter means;
   a sample;
   detector means for alternately detecting (1) the emanations from said sample when said sample is illuminated by said sample beam, and (2) said reference beam; and
   analyzing means for analyzing the spectra of said sample emanations and said reference beam.

2. The spectrophotometer of claim 1 wherein said chopper means further comprises:
   each of said vanes comprises a plurality of segments; and
   transmissive means included in some of said segments which pass said beams and opaque means included in others of said segments which block said beams.

3. The spectrophotometer of claim 2 wherein:
   one of said segments includes a reference material for selective insertion in said reference beam; and
   said analyzing means further analyzes the spectra of said reference material.

4. The spectrophotometer of claim 3 wherein:
   included in said plurality of segments are a plurality of reference materials, one reference material per corresponding segment; and
   said analyzing means further analyzes the spectra of all of said reference materials.

5. The spectrophotometer of claim 1 wherein:
   said chopper means further comprises a motor having an output shaft connected to said motor, with said pair of vanes being connected to said output shaft; and
   said beamsplitter means comprises a planar beamsplitter oriented such that an edge of said beamsplitter is adjacent the end of said output shaft and the plane of said beamsplitter substantially bisects said ninety degree angle of said chopper means.

6. The spectrophotometer of claim 5 wherein:
   said motor is a stepping motor, and said chopper means is stepped to position said vanes such that only one of said sample beams and said reference beams is passed at any given time.

7. A dual beam spectrophotometer, comprising:
   means for producing a monochromatic beam;
   beamsplitter means for dividing said monochromatic beam into a reference beam and a sample beam;
   chopper means for mutually exclusively blocking or passing said reference beam and said sample beam, said chopper means at least partially enclosing said beamsplitter means;
   a sample;
   detector means for alternately detecting (1) the emanations from said sample when said sample is illuminated by said sample beam, and (2) said reference beam; and
   analyzing means for analyzing the spectra of said sample emanations and said reference beam, wherein
   said chopper means comprises a hollow cylinder enclosing said beamsplitter means.

8. The spectrophotometer of claim 7 wherein:
   said cylindrical chopper means includes a plurality of segments, some of which block said beams and some of which pass said beams to and from said beamsplitter means.

9. The spectrophotometer of claim 8 wherein:
   said cylindrical chopper means comprises eight planar sides, each of which constitutes one of said segments.

10. The spectrophotometer of claim 8 wherein:
    transmissive means are included in the segments which pass said beams and opaque means are included in the segments which block said beams.

11. The spectrophotometer of claim 8 wherein:
    one of said segments includes a reference material for selective insertion in said reference beam; and
    said analyzing means further analyzes the spectra of said reference material.

12. The spectrophotometer of claim 11 wherein:
    included in said plurality of segments are a plurality of reference materials, one reference material per corresponding segment.

13. The spectrophotometer of claim 8 wherein:
    said cylindrical chopper means comprises an annular cylinder in which each of said plurality of segments are angularly spaced around said annular cylinder.

14. The spectrophotometer of claim 13 wherein:
    transmissive means are included in the segments which pass said beams and opaque means are included in the segments which block said beams.

15. The spectrophotometer of claim 13 wherein:
    one of said segments includes a reference material for selective insertion in said reference beam; and
    said analyzing means further analyzes the spectra of said reference material.

16. The spectrophotometer of claim 13 wherein:

included in said plurality of segments are a plurality of reference materials, one reference material per corresponding segment.

17. A spectrophotometer, comprising:

means for producing a monochromatic beam;

beamsplitter means for dividing said monochromatic beam into a reference beam and a sample beam;

a sample;

a detector;

chopper means for mutually exclusively blocking or passing said reference beam and said sample beam, said chopper means including a first segment means for passing said sample beam to a sample material while blocking said reference beam, a second segment means for passing said reference beam directly to said detector while blocking said sample beam, and a third segment means including a reference material therein for passing said reference beam to said detector through said reference material while blocking said sample beam;

means for transmitting radiation emanating from said sample in response to illumination thereof by said sample beam; and means for analyzing the output signals of said detector means.

18. The spectrophotometer of claim 17 wherein said third segment means includes a plurality of segments, each of which include a reference material.

19. The spectrophotometer of claim 18 wherein each reference material is different from all of the other reference materials.

20. A spectrophotometer, comprising:

light source means for producing a beam of polychromatic light;

monochromator means for cyclically dispersing said polychromatic beam into a monochromatic beam, said monochromator means comprising an oscillating grating;

first chopper means for blocking transmission of said monochromatic beam during one-half of each oscillation of said grating and passing transmission of said monochromatic beam during the other half of each oscillation of said grating;

beamsplitter means for splitting said monochromatic beam into a reference beam and a sample beam;

second chopper means for mutually exclusively blocking or passing said reference beam and said sample beam;

detector means for detecting incident radiation;

means for illuminating said detector means with said reference beam;

a sample material;

means illuminating said sample material with said sample beam;

means for illuminating said detector means with radiation emanating from said sample material in response to illumination thereof by said sample beam; and means for analyzing the output signals of said detector means.

21. The spectrophotometer of claim 20 wherein said grating alternately oscillates clockwise and counter-clockwise and said first chopper means blocks said transmission of said monochromatic light during the clockwise movements of said grating while passing transmission of said monochromatic light during the counter-clockwise movements of said grating.

22. A spectrophotometer for analyzing a sample material, comprising:

light source means for producing a polychromatic beam of light;

monochromator means for cyclically dispersing said polychromatic beam into a monochromatic beam comprising spectra from two spectral bands;

means for blocking transmission of the monochromatic beam spectra of one of said two spectral bands and for allowing transmission of the monochromatic beam spectra of the other of said two spectral bands;

means responsive to said other monochromatic beam spectra for generating a reference beam and a sample beam;

means for mutually exclusively blocking or passing said reference beam and said sample beam;

detector means for detecting incident radiation;

means for illuminating said detector means with said reference beam;

a sample material;

means illuminating said sample material with said sample beam;

means for illuminating said detector means with radiation emanating from said sample material in response to illumination thereof by said sample beam; and means for analyzing the output signals of said detector means.

23. The spectrophotometer of claim 22 wherein said monochromator means includes a grating which alternately oscillates clockwise and counter-clockwise and said one of said two spectral bands is dispersed during said clockwise oscillations and said other of said two spectral bands is dispersed during said counter-clockwise oscillations.

* * * * *